United States Patent
Chae et al.

(10) Patent No.: US 11,224,052 B2
(45) Date of Patent: Jan. 11, 2022

(54) METHOD AND APPARATUS FOR TRANSMITTING AND RECEIVING SA AND DATA IN WIRELESS COMMUNICATION SYSTEM

(71) Applicant: LG Electronics Inc., Seoul (KR)

(72) Inventors: Hyukjin Chae, Seoul (KR); Hanbyul Seo, Seoul (KR); Seungmin Lee, Seoul (KR)

(73) Assignee: LG Electronics Inc., Seoul (KR)

(*) Notice: Subject to any disclaimer, the term of this patent is extended or adjusted under 35 U.S.C. 154(b) by 337 days.

(21) Appl. No.: 16/085,865

(22) PCT Filed: Mar. 17, 2017

(86) PCT No.: PCT/KR2017/002881
§ 371 (c)(1),
(2) Date: Jul. 23, 2020

(87) PCT Pub. No.: WO2017/160111
PCT Pub. Date: Sep. 21, 2017

(65) Prior Publication Data
US 2020/0351904 A1 Nov. 5, 2020

Related U.S. Application Data

(60) Provisional application No. 62/309,950, filed on Mar. 17, 2016.

(51) Int. Cl.
*H04W 72/12* (2009.01)
*H04L 5/00* (2006.01)

(52) U.S. Cl.
CPC ........... *H04W 72/12* (2013.01); *H04L 5/0094* (2013.01)

(58) Field of Classification Search
CPC ............................. H04L 5/0094; H04W 72/12
USPC .......................................................... 370/329
See application file for complete search history.

(56) References Cited

U.S. PATENT DOCUMENTS

2015/0271846 A1 9/2015 Kowalski et al.
2015/0334698 A1 11/2015 Park et al.
2015/0382366 A1 12/2015 Wang

OTHER PUBLICATIONS

International Search Report in International Application No. PCT/KR2017/002881, dated Jun. 21, 2017, 16 pages (with English Translation).
Alcatel-Lucent Shanghai Bell, Alcatel-Lucent, "Resource allocation and selection for scheduling assignment for D2D communication," 'R1-143019,' 3GPP TSG RAN WG1 Meeting #78, Dresden, Germany, Aug. 18-22, 2014, 6 pages.
ZTE, "Scheduling Assignment enhancement for V2V," 'R1-160683,' 3GPP TSG-RAN WG1 Meeting #84, St Julian's, Malta, Feb. 15-19, 2016, 7 pages.

*Primary Examiner* — Angel T Brockman
(74) *Attorney, Agent, or Firm* — Fish & Richardson P.C.

(57) ABSTRACT

One embodiment of the present invention relates to a method for receiving, by a UE, scheduling assignment (SA) and data in a wireless communication system, comprising the steps of: receiving a first SA and a second SA in a first subframe; and receiving first data and second data through subchannels indicated by the first SA and the second SA, respectively, wherein the first data and the second data are received through the first subchannel and the second subchannel, respectively, and each of the first subchannel and the second subchannel is composed of a plurality of clusters spaced apart from each other in a frequency domain.

16 Claims, 19 Drawing Sheets

FIG. 5
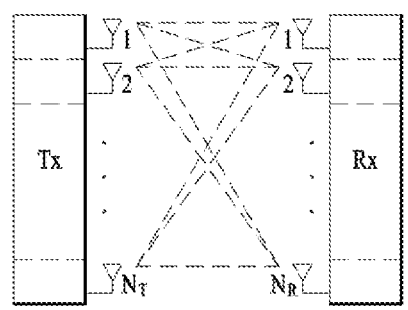
(a)
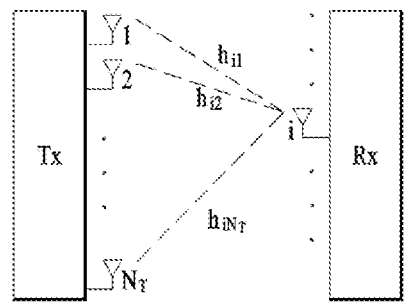
(b)

FIG. 8
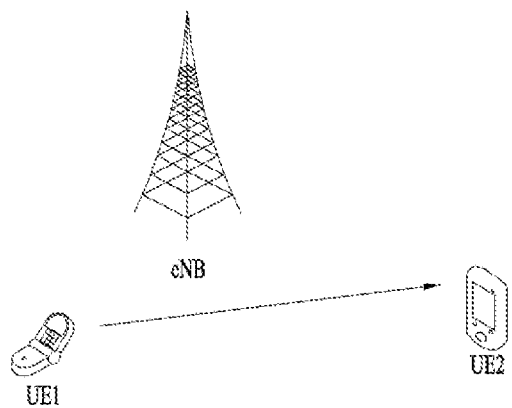
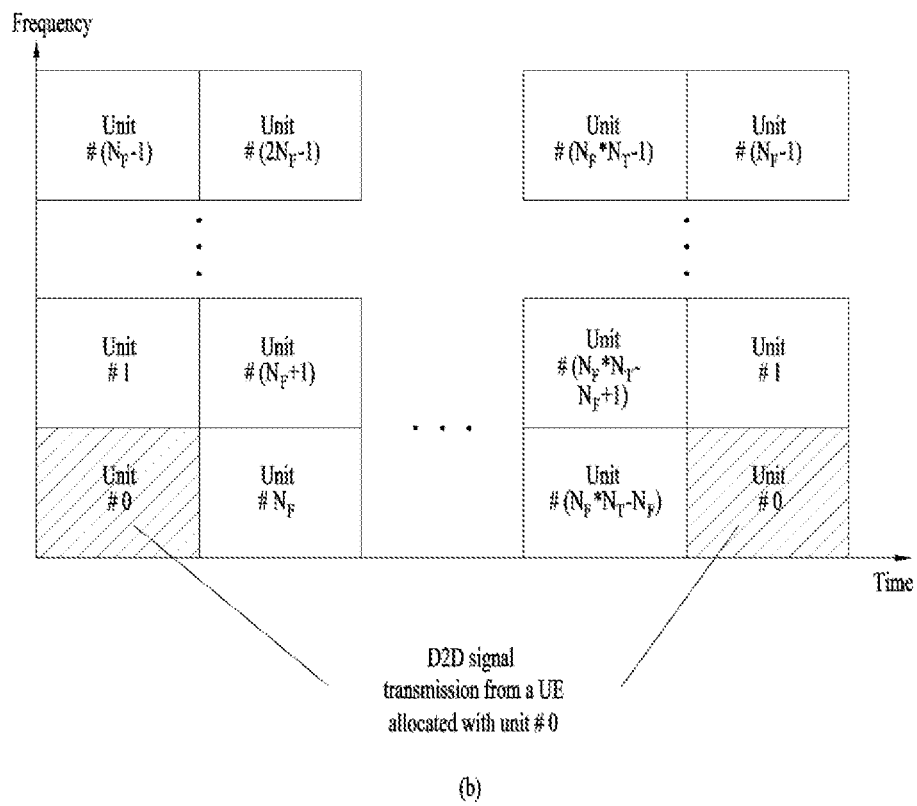

FIG. 15

| | | 6RB | | | |
|---|---|---|---|---|---|
| 0 | 9 | 18 | 26 | 34 | 42 |
| 1 | 10 | 19 | 27 | 35 | 43 |
| 2 | 11 | 20 | 28 | 36 | 44 |
| 3 | 12 | 21 | 29 | 37 | 45 |
| 4 | 13 | 22 | 30 | 38 | 46 |
| 5 | 14 | 23 | 31 | 39 | 47 |
| 6 | 15 | 24 | 32 | 40 | 48 |
| 7 | 16 | 25 | 33 | 41 | 49 |
| 8 | 17 | null | null | null | null |

(a)

| | | 6RB | | | |
|---|---|---|---|---|---|
| 0 | 9 | 18 | 27 | 36 | 45 |
| 1 | 10 | 19 | 28 | 37 | 46 |
| 2 | 11 | 20 | 29 | 38 | 47 |
| 3 | 12 | 21 | 30 | 39 | 48 |
| 4 | 13 | 22 | 31 | 40 | null |
| 5 | 14 | 23 | 32 | 41 | null |
| 6 | 15 | 24 | 33 | 42 | null |
| 7 | 16 | 25 | 34 | 43 | null |
| 8 | 17 | 26 | 35 | 44 | null |

| 0 | 5 | 10 | 15 | 20 | 25 | 30 | 35 | 40 | 45 |
|---|---|----|----|----|----|----|----|----|----|
| 1 | 6 | 11 | 16 | 21 | 26 | 31 | 36 | 41 | 46 |
| 2 | 7 | 12 | 17 | 22 | 27 | 32 | 37 | 42 | 47 |
| 3 | 8 | 13 | 18 | 23 | 28 | 33 | 38 | 43 | 48 |
| 4 | 9 | 14 | 19 | 24 | 29 | 34 | 39 | 44 | 49 |

10RB

METHOD AND APPARATUS FOR TRANSMITTING AND RECEIVING SA AND DATA IN WIRELESS COMMUNICATION SYSTEM

CROSS-REFERENCE TO RELATED APPLICATIONS

This application is a National Stage application under 35 U.S.C. § 371 of International Application No. PCT/KR2017/002881, filed on Mar. 17, 2017 which claims the benefit of U.S. Provisional Application No. 62/309,950, filed on Mar. 17, 2016. The disclosures of the prior applications are incorporated by reference in their entirety.

TECHNICAL FIELD

Following description relates to a wireless communication system, and more particularly, to a method of transmitting and receiving SA and data and an apparatus therefor.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

Device-to-Device (D2D) communication means a communication system for directly exchanging audio, data and the like between user equipments without passing through a base station (evolved NodeB: eNB) by establishing a direct link between the user equipments. D2D communication may include such a system as a UE-to-UE (user equipment-to-user equipment) communication, Peer-to-Peer communication and the like. And, the D2D communication system may be applicable to M2M (Machine-to-Machine) communication, MTC (Machine Type Communication) and the like.

D2D communication is currently considered as one of schemes for setting a load put on a base station due to the rapidly increasing data traffic. For instance, according to D2D communication, unlike an existing wireless communication system, since data is exchanged between devices without passing through a base station, overload of a network can be reduced. Moreover, by introducing D2D communication, it is able to expect effects such as procedure reduction of a base station, power consumption reduction of devices involved in D2D, data transmission speed increase, reception capability increase of a network, load distribution, extension of cell coverage and the like.

Currently, discussion on V2X (Vehicle to Everything) communication is in progress in a form associated with D2D communication. The V2X communication corresponds to a concept including V2V communication between vehicle UEs, V2P communication between a vehicle and a UE of a different type, and V2I communication between a vehicle and an RSU (roadside unit).

DISCLOSURE OF THE INVENTION

Technical Task

A technical task of the present invention is to provide a method for a UE to efficiently transmit SA and data in D2D communication, V2X communication, and the like while PSD (power spectral density) limitation is satisfied.

Technical tasks obtainable from the present invention are non-limited by the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of receiving SA (Scheduling Assignment) and data, which are received by a UE in a wireless communication system, includes the steps of receiving SA 1 and SA 2 in a first subframe, and receiving data 1 and data 2 via subchannels indicated by the SA 1 and the SA 2, respectively. In this case, the data 1 and the data 2 are received via a subchannel 1 and a subchannel 2, respectively, and each of the subchannel 1 and the subchannel 2 can be configured by a plurality of clusters separated from each other in frequency domain.

To further achieve these and other advantages and in accordance with the purpose of the present invention, according to a different embodiment, a UE (User Equipment) receiving SA (Scheduling Assignment) and data in a wireless communication system includes a transmitter and a receiver, and a processor, the processor configured to receive SA 1 and SA 2 in a first subframe via the transmitter, the processor configured to receive data 1 and data 2 via subchannels indicated by the SA 1 and the SA 2, respectively. In this case, the data 1 and the data 2 are received via a subchannel 1 and a subchannel 2, respectively, and each of the subchannel 1 and the subchannel 2 can be configured by a plurality of clusters separated from each other in frequency domain.

When a plurality of the clusters are separated in each of the subchannel 1 and the subchannel 2, a space of the separation may be the same in the subchannel 1 and the subchannel 2.

Each of a plurality of the clusters can include one or more consecutive resource blocks.

An index of a subchannel can be sequentially assigned to subchannels including clusters adjacent to each other.

The data 2 may correspond to retransmission of the data 1.

The data 2 may correspond to an RV (Redundancy Version) of the data 1.

When the UE performs decoding, combining between the SA 1 and the SA 2 is not permitted and combining between the data 1 and the data 2 can be permitted.

To further achieve these and other advantages and in accordance with the purpose of the present invention, according to a further different embodiment, a method of transmitting SA (Scheduling Assignment) and data, which are transmitted by a UE in a wireless communication system, includes the steps of transmitting SA 1 and SA 2 in a first subframe, and transmitting data 1 and data 2 via subchannels indicated by the SA 1 and the SA 2, respectively. In this case, the data 1 and the data 2 are transmitted via a subchannel 1 and a subchannel 2, respectively, and each of the subchannel 1 and the subchannel 2 can be configured by a plurality of clusters separated from each other in frequency domain.

To further achieve these and other advantages and in accordance with the purpose of the present invention, according to a further different embodiment, a UE (User Equipment) transmitting SA (Scheduling Assignment) and data in a wireless communication system includes a transmitter and a receiver, and a processor, the processor configured to transmit SA 1 and SA 2 in a first subframe via the transmitter, the processor configured to transmit data 1 and data 2 via subchannels indicated by the SA 1 and the SA 2, respectively. In this case, the data 1 and the data 2 are received via a subchannel 1 and a subchannel 2, respectively, and each of the subchannel 1 and the subchannel 2 can be configured by a plurality of clusters separated from each other in frequency domain.

When a plurality of the clusters are separated in each of the subchannel 1 and the subchannel 2, a space of the separation may be the same in the subchannel 1 and the subchannel 2.

Each of a plurality of the clusters can include one or more consecutive resource blocks.

An index of a subchannel can be sequentially assigned to subchannels including clusters adjacent to each other.

The data 2 may correspond to retransmission of the data 1.

The data 2 may correspond to an RV (Redundancy Version) of the data 1.

When the UE performs decoding on the SA and the data, combining between the SA 1 and the SA 2 is not permitted and combining between the data 1 and the data 2 can be permitted.

ADVANTAGEOUS EFFECTS

In case of performing transmission via a narrow band, it is unable to fully use transmit power due to PSD limitation per frequency. According to the present invention, it is able to solve the problem.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 5 is a diagram for a configuration of a wireless communication system having multiple antennas;
FIG. 8 is a diagram for an example of a D2D resource pool for performing D2D communication;
FIGS. 15 to 17 are diagrams for explaining an interleaver according to one embodiment of the present invention;
FIG. 18 is a diagram for explaining repetitive transmission according to one embodiment of the present invention.

BEST MODE

Mode for Invention

Figure 1:
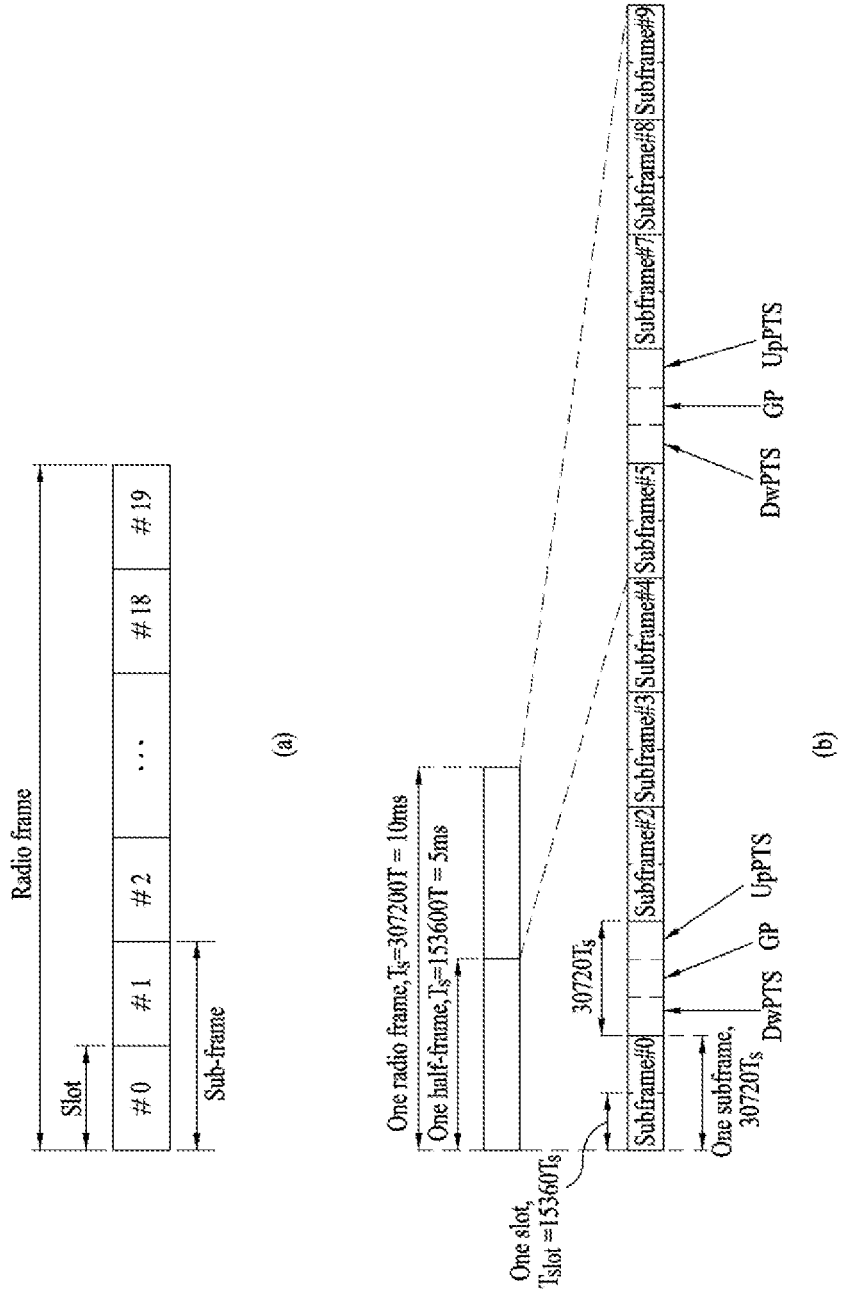
FIG. 1 is a diagram for a structure of a radio frame.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc.

The term "cell", as used herein, may be applied to transmission and reception points such as a base station (eNB), sector, remote radio head (RRH) and relay, and may also be extensively used by a specific transmission/reception point to distinguish between component carriers.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

LTE/LTE-A Resource Structure/Channel

With reference to FIG. 1, the structure of a radio frame will be described below.

In a cellular Orthogonal Frequency Division Multiplexing (OFDM) wireless Packet communication system, uplink and/or downlink data Packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
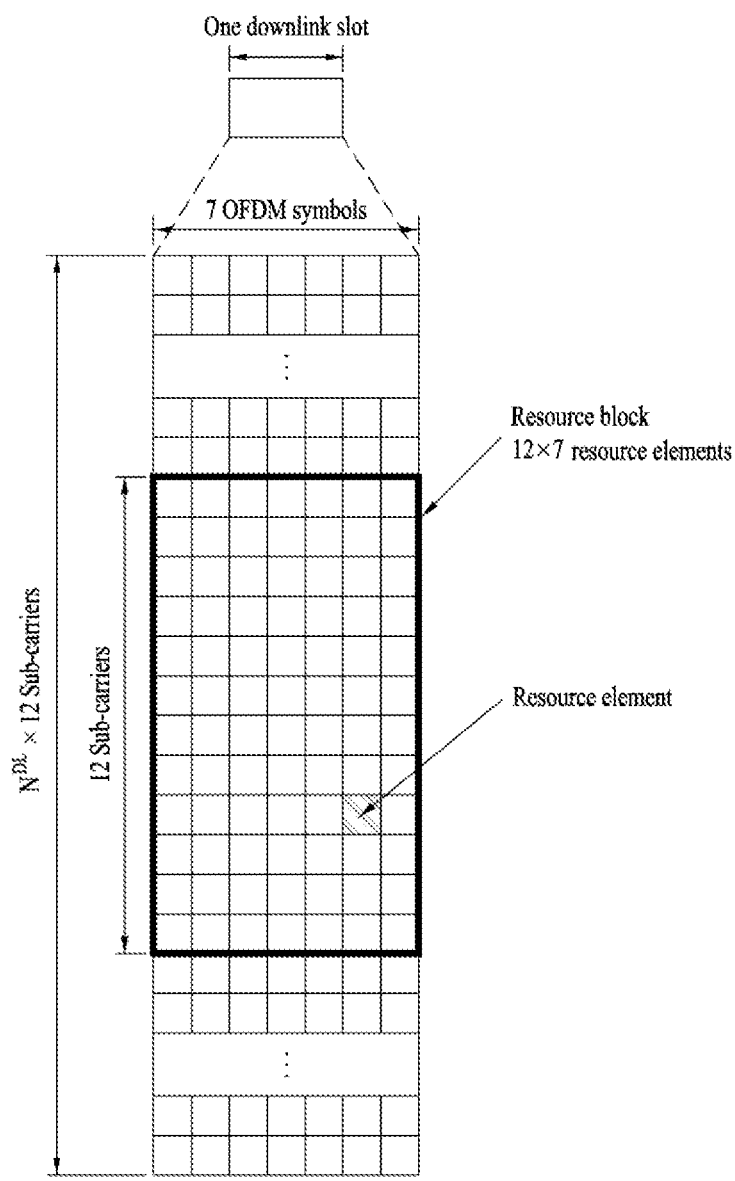
FIG. 2 is a diagram for a resource grid in a downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, NDL depends on a downlink transmission bandwidth. An uplink slot may have the same structure as a downlink slot.

Figure 3:
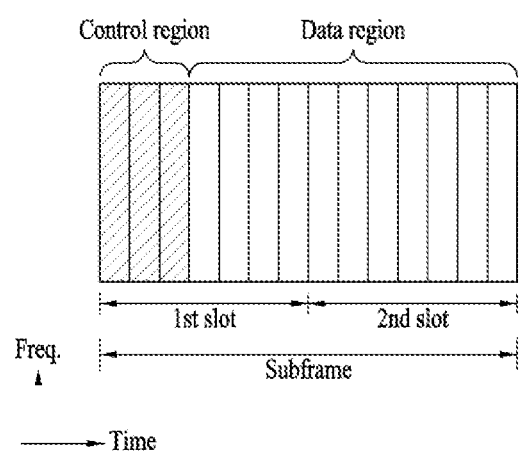
FIG. 3 is a diagram for a structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
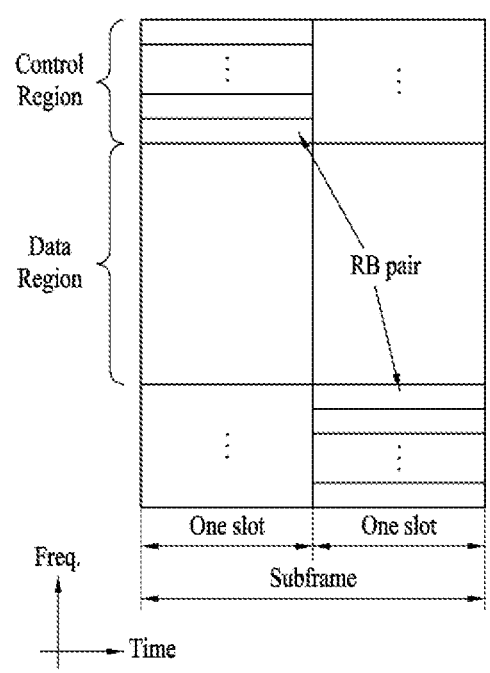
FIG. 4 is a diagram for a structure of an uplink subframe.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signals (RSs)

In a wireless communication system, a Packet is transmitted on a radio channel. In view of the nature of the radio channel, the Packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between Transmission (Tx) antennas and Reception (Rx) antennas is required for successful signal reception. Accordingly, an RS should be transmitted through each Tx antenna.

RSs may be divided into downlink RSs and uplink RSs. In the current LTE system, the uplink RSs include:

i) DeModulation-Reference Signal (DM-RS) used for channel estimation for coherent demodulation of information delivered on a PUSCH and a PUCCH; and ii) Sounding Reference Signal (SRS) used for an eNB or a network to measure the quality of an uplink channel in a different frequency.

The downlink RSs are categorized into:

i) Cell-specific Reference Signal (CRS) shared among all UEs of a cell;

ii) UE-specific RS dedicated to a specific UE;

iii) DM-RS used for coherent demodulation of a PDSCH, when the PDSCH is transmitted;

iv) Channel State Information-Reference Signal (CSI-RS) carrying CSI, when downlink DM-RSs are transmitted;

v) Multimedia Broadcast Single Frequency Network (MBSFN) RS used for coherent demodulation of a signal transmitted in MBSFN mode; and vi) positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of MIMO System

FIG. 5 is a diagram illustrating a configuration of a wireless communication system having multiple antennas.

As shown in FIG. 5(a), if the number of transmit antennas is increased to NT and the number of receive antennas is increased to NR, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \quad \text{[Equation 1]}$$

For instance, in an MIMO communication system, which uses 4 transmit antennas and 4 receive antennas, a transmission rate 4 times higher than that of a single antenna system can be obtained. Since this theoretical capacity increase of the MIMO system has been proved in the middle of 90's, many ongoing efforts are made to various techniques to substantially improve a data transmission rate. In addition, these techniques are already adopted in part as standards for various wireless communications such as 3G mobile communication, next generation wireless LAN and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are NT transmit antennas and NR receive antennas.

Regarding a transmitted signal, if there are NT transmit antennas, the maximum number of pieces of information that can be transmitted is NT. Hence, the transmission information can be represented as shown in Equation 2.

$$S=[s_1, s_2, \ldots, s_{N_T}]^T \quad \text{[Equation 2]}$$

Meanwhile, transmit powers can be set different from each other for individual pieces of transmission information $s_1, s_2, \ldots, s_{N_T}$, respectively. If the transmit powers are set to $P_1, P_2, \ldots, P_{N_T}$, respectively, the transmission information with adjusted transmit powers can be represented as Equation 3.

$$\hat{s}=[\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In addition, Ŝ can be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Assuming a case of configuring NT transmitted signals $x_1, x_2, \ldots, x_{N_T}$, which are actually transmitted, by applying weight matrix W to the information vector Ŝ having the adjusted transmit powers, the weight matrix W serves to appropriately distribute the transmission information to each antenna according to a transport channel state. $x_1, x_2, \ldots, x_{N_T}$ can be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \\ w_{i1} & w_{i2} & \ldots & w_{iN_T} \\ \vdots & & & \ddots \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \quad \text{[Equation 5]}$$

$$W\hat{s} = WPs$$

In Equation 5, $w_{ij}$ denotes a weight between an $i^{th}$ transmit antenna and $j^{th}$ information. W is also called a precoding matrix.

If the NR receive antennas are present, respective received signals $y_1, y_2, \ldots, y_{N_R}$ of the antennas can be expressed as follows.

$$y=[y_1, y_2, \ldots, y_{N_R}]^T \quad \text{[Equation 6]}$$

If channels are modeled in the MIMO wireless communication system, the channels may be distinguished according to transmit/receive antenna indexes. A channel from the transmit antenna j to the receive antenna i is denoted by $h_{ij}$. In $h_{ij}$, it is noted that the indexes of the receive antennas precede the indexes of the transmit antennas in view of the order of indexes.

FIG. 5(b) is a diagram illustrating channels from the NT transmit antennas to the receive antenna i. The channels may be combined and expressed in the form of a vector and a matrix. In FIG. 5(b), the channels from the NT transmit antennas to the receive antenna i can be expressed as follows.

$$h_i^T=[h_{i1}, h_{i2}, \ldots, h_{iN_T}] \quad \text{[Equation 7]}$$

Accordingly, all channels from the NT transmit antennas to the NR receive antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \quad \text{[Equation 8]}$$

An AWGN (Additive White Gaussian Noise) is added to the actual channels after a channel matrix H. The AWGN $n_1, n_2, \ldots, n_{N_R}$ respectively added to the NR receive antennas can be expressed as follows.

$$n=[n_1, n_2, \ldots, n_{N_R}]^T \quad \text{[Equation 9]}$$

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & & \ddots \\ h_{N_R 1} & h_{N_R 2} & \ldots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 10]}$$

$$Hx + n$$

Meanwhile, the number of rows and columns of the channel matrix H indicating the channel state is determined by the number of transmit and receive antennas. The number of rows of the channel matrix H is equal to the number NR of receive antennas and the number of columns thereof is equal to the number $N_R$ of transmit antennas. That is, the channel matrix H is an NR×NT matrix.

The rank of the matrix is defined by the smaller of the number of rows and the number of columns, which are independent from each other. Accordingly, the rank of the matrix is not greater than the number of rows or columns. The rank rank(H) of the channel matrix H is restricted as follows.

$$\text{rank}(H) \leq \min(N_T, N_R) \quad \text{[Equation 11]}$$

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In the description of the present document, 'rank' for MIMO transmission indicates the number of paths capable of sending signals independently on specific time and frequency resources and 'number of layers' indicates the number of signal streams transmitted through the respective paths. Generally, since a transmitting end transmits the number of layers corresponding to the rank number, one rank has the same meaning of the layer number unless mentioned specially.

Synchronization Acquisition of D2D UE

Now, a description will be given of synchronization acquisition between UEs in D2D communication based on the foregoing description in the context of the legacy LTE/LTE-A system. In an OFDM system, if time/frequency synchronization is not acquired, the resulting Inter-Cell Interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a Synchronization Reference Node (SRN, also referred to as a synchronization source)) may transmit a D2D Synchronization Signal (D2DSS) and the remaining UEs may transmit and receive signals in synchronization with the D2DSS.

Figure 6:
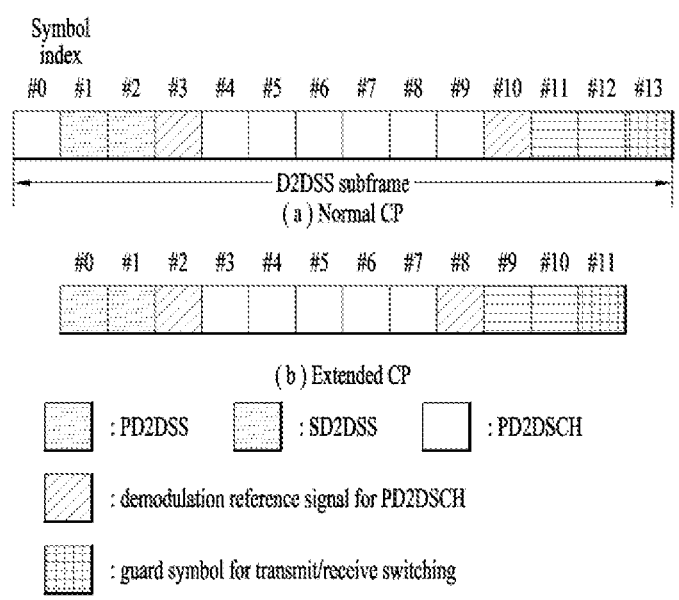
FIG. 6 is a diagram for a subframe in which a D2D synchronization signal is transmitted.

D2DSSs may include a Primary D2DSS (PD2DSS) or a Primary Sidelink Synchronization Signal (PSSS) and a Secondary D2DSS (SD2DSS) or a Secondary Sidelink Synchronization Signal (SSSS). The PD2DSS may be configured to have a similar/modified/repeated structure of a Zadoff-chu sequence of a predetermined length or a Primary Synchronization Signal (PSS). Unlike a DL PSS, the PD2DSS may use a different Zadoff-chu root index (e.g., 26, 37). And, the SD2DSS may be configured to have a similar/modified/repeated structure of an M-sequence or a Secondary Synchronization Signal (SSS). If UEs synchronize their timing with an eNB, the eNB serves as an SRN and the D2DSS is a PSS/SSS. Unlike PSS/SSS of DL, the PD2DSS/SD2DSS follows UL subcarrier mapping scheme. FIG. 6 shows a subframe in which a D2D synchronization signal is transmitted. A Physical D2D Synchronization Channel (PD2DSCH) may be a (broadcast) channel carrying basic (system) information that a UE should first obtain before D2D signal transmission and reception (e.g., D2DSS-related information, a Duplex Mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS. A DMRS can be used to demodulate the PD2DSCH.

The SRN may be a node that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 7:
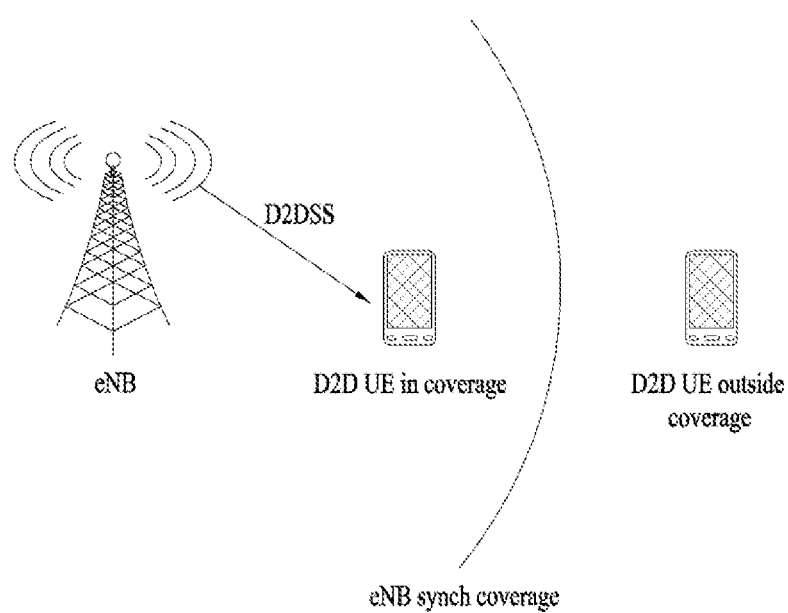
FIG. 7 is a diagram for explaining relay of a D2D signal.

In a situation illustrated in FIG. 7, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct Amplify-and-Forward (AF)-relay of an SS transmitted by an eNB. As the D2DSS is relayed, an in-coverage UE may communicate directly with an out-of-coverage UE.

D2D Resource Pool

FIG. 8 shows an example of a UE1, a UE2 and a resource pool used by the UE1 and the UE2 performing D2D communication. In FIG. 8(a), a UE corresponds to a terminal or such a network device as an eNB transmitting and receiving a signal according to a D2D communication scheme. A UE selects a resource unit corresponding to a specific resource from a resource pool corresponding to a set of resources and the UE transmits a D2D signal using the selected resource unit. A UE2 corresponding to a reception UE receives a configuration of a resource pool in which the UE1 is able to transmit a signal and detects a signal of the UE1 in the resource pool. In this case, if the UE1 is located at the inside of coverage of an eNB, the eNB can inform the UE1 of the resource pool. If the UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for D2D signal transmission. FIG. 8(b) shows an example of configuring a resource unit. Referring to FIG. 8(b), the entire frequency resources are divided into the $N_F$ number of resource units and the entire time resources are divided into the $N_T$ number of resource units. In particular, it is able to define $N_F*N_T$ number of resource units in total. In particular, a resource pool can be repeated with a period of $N_T$ subframes. Specifically, as shown in FIG. 8, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a D2D signal.

A resource pool can be classified into various types. First of all, the resource pool can be classified according to contents of a D2D signal transmitted via each resource pool. For example, the contents of the D2D signal can be classified into various signals and a separate resource pool can be configured according to each of the contents. The contents of the D2D signal may include SA (scheduling assignment), a D2D data channel, and a discovery channel. The SA may correspond to a signal including information on a resource position of a D2D data channel, information on MCS (modulation and coding scheme) necessary for modulating and demodulating a data channel, information on a MIMO transmission scheme, information on TA (timing advance), and the like. The SA signal can be transmitted on an identical resource unit in a manner of being multiplexed with D2D data. In this case, an SA resource pool may correspond to a pool of resources that an SA and D2D data are transmitted in a manner of being multiplexed. The SA signal can also be referred to as a D2D control channel or a PSCCH (physical sidelink control channel). The D2D data channel (or, PSSCH (physical sidelink shared channel)) corresponds to a resource pool used by a transmission UE to transmit user data. If an SA and a D2D data are transmitted in a manner of being multiplexed in an identical resource unit, D2D data channel except SA information can be transmitted only in a resource pool for the D2D data channel. In other word, resource elements (REs), which are used to transmit SA information in a specific resource unit of an SA resource pool, can also be used for transmitting D2D data in a D2D data channel resource pool. The discovery channel may correspond to a resource pool for a message that enables a neighboring UE to discover transmission UE transmitting information such as ID of the UE, and the like.

Although contents of D2D signal are identical to each other, it may use a different resource pool according to a transmission/reception attribute of the D2D signal. For example, in case of the same D2D data channel or the same discovery message, the D2D data channel or the discovery signal can be classified into a different resource pool according to a transmission timing determination scheme (e.g., whether a D2D signal is transmitted at the time of receiving a synchronization reference signal or the timing to which a prescribed timing advance is added) of a D2D signal, a resource allocation scheme (e.g., whether a transmission resource of an individual signal is designated by an eNB or an individual transmission UE selects an individual signal transmission resource from a pool), a signal format (e.g., number of symbols occupied by a D2D signal in a subframe, number of subframes used for transmitting a D2D signal), signal strength from an eNB, strength of transmit power of a D2D UE, and the like. For clarity, a method for an eNB to directly designate a transmission resource of a D2D transmission UE is referred to as a mode 1. If a transmission resource region is configured in advance or an eNB designates the transmission resource region and a UE directly selects a transmission resource from the transmission resource region, it is referred to as a mode 2. In case of performing D2D discovery, if an eNB directly indicates a resource, it is referred to as a type 2. If a UE directly selects a transmission resource from a predetermined resource region or a resource region indicated by the eNB, it is referred to as a type 1.

Transmission and Reception of SA

A mode 1 UE can transmit an SA signal (or, a D2D control signal, SCI (sidelink control information)) via a resource configured by an eNB. A mode 2 UE receives a configured resource to be used for D2D transmission. The mode 2 UE can transmit SA by selecting a time frequency resource from the configured resource.

Figure 9:
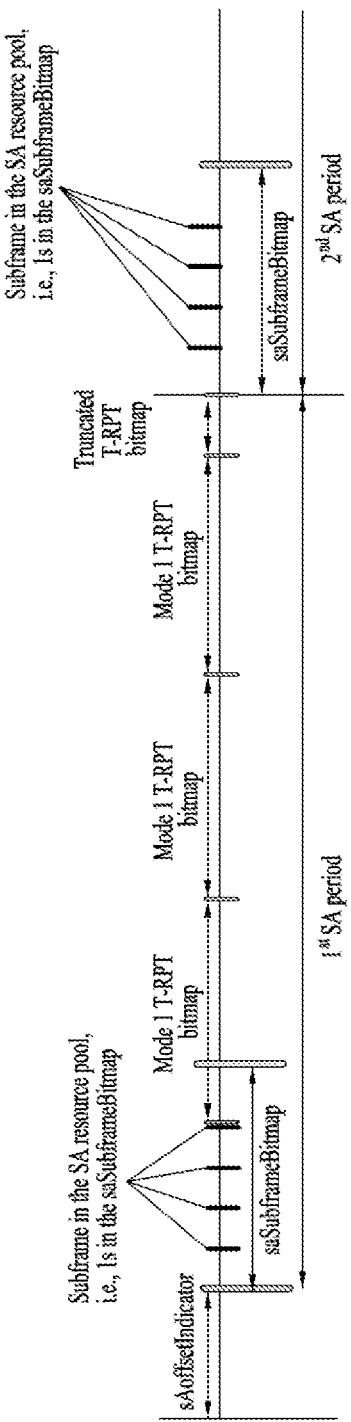
FIG. 9 is a diagram for explaining an SA period.

The SA period can be defined as FIG. 9. Referring to FIG. 9, a first SA period can start at a subframe apart from a specific system frame as much as a prescribed offset (SAOffsetIndicator) indicated by higher layer signaling. Each SA period can include an SA resource pool and a subframe pool for transmitting D2D data. The SA resource pool can include subframes ranging from a first subframe of an SA period to the last subframe among subframes indicated by a subframe bitmap (saSubframeBitmap) to transmit SA. In case of mode 1, T-RPT (time-resource pattern for transmission) is applied to the resource pool for transmitting D2D data to determine a subframe in which an actual data is transmitted. As shown in the drawing, if the number of subframes included in an SA period except the SA resource pool is greater than the number of T-RPT bits, the T-RPT can be repeatedly applied and the lastly applied T-RPT can be applied in a manner of being truncated as many as the number of remaining subframes.

Meanwhile, in V2V (vehicle to vehicle) communication, a CAM (cooperative awareness message) of a periodic message type, a DENM (decentralized environmental notification message) of an event triggered message type, and the like can be transmitted. The CAM can include dynamic status information of a vehicle such as direction and velocity, static data of a vehicle such as a size, and basic vehicle information such as external light status, path history, and the like. A size of the CAM may correspond to 50 to 300 bytes. The DENM may correspond to a message which is generated when an accidental status such as malfunction of a vehicle, an accident, and the like occurs. A size of the DENM may be less than 3000 bytes. All vehicles located within a transmission range of the DENM can receive the DENM. In this case, the DENM may have a priority higher than a priority of the CAM. In this case, in the aspect of a single UE, the higher priority means that a UE preferentially transmits a message of a higher priority when messages are transmitted at the same time. Or, the higher priority means that a UE intends to preferentially transmit a message of a higher priority in time among a plurality of messages. In the aspect of a plurality of UEs, since a message of a higher priority receives less interference compared to a message of a lower priority, it may be able to lower a reception error rate. If security overhead is included in the CAM, the CAM may have a bigger message size.

Figure 10:
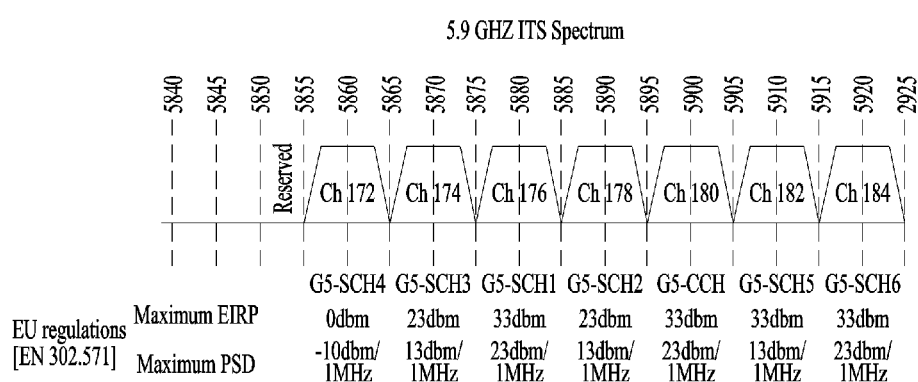
FIG. 10 is a diagram illustrating a PSD limitation regulation.

In LTE or 5G communication, 5.9 GHz band can be used as a carrier. In this case, the 5.9 GHz band has such a regulation as 13/23 dBM PSD limitation per 1 MHz. FIG. 10 illustrates the regulation. According to the regulation, in case of performing transmission via a narrow band (narrower than 10 RBs), it is unable to fully use transmit power due to PSD limitation per frequency. Hence, a method of transmitting and receiving a physical layer signal according to an embodiment of the present invention is proposed to solve the problem above.

Method Through Subchannel Structure

When SA and data are transmitted according to one embodiment of the present invention, it is able to solve the problem above using a resource structure such as a subchannel consisting of RBs separated from each other.

In the present invention, a subchannel may correspond to a basic unit in which resource allocation is performed to transmit a prescribed message such as V2X and the like. A subchannel can include RBs separated from each other (an RB group or a group of clusters described later). In this case, the RBs included in the subchannel can be separated from each other with the same level. (In each of subchannels, RB groups or clusters can be separated from each other with the same space.) In this case, the separation can be used for solving the aforementioned problem (in case of performing transmission on a narrow band (narrower than 10 RBs), it is unable to fully use transmit power due to PSD limitation per frequency). The separation may correspond to minimum 6 RBs. In particular, in case of performing V2X, since a size type of a transmitted message is not various, a certain RB(s) group is configured by a single subchannel to reduce a resource allocation bit size and resource allocation can be performed in a unit of an RB(s) group. For example, 5 RBs (RB group or cluster group) separated from each other with a space of 10 RBs can be configured as a subchannel in a system of 50 RBs. A UE can transmit a message using a single subchannel or a plurality of subchannels.

Figure 11:
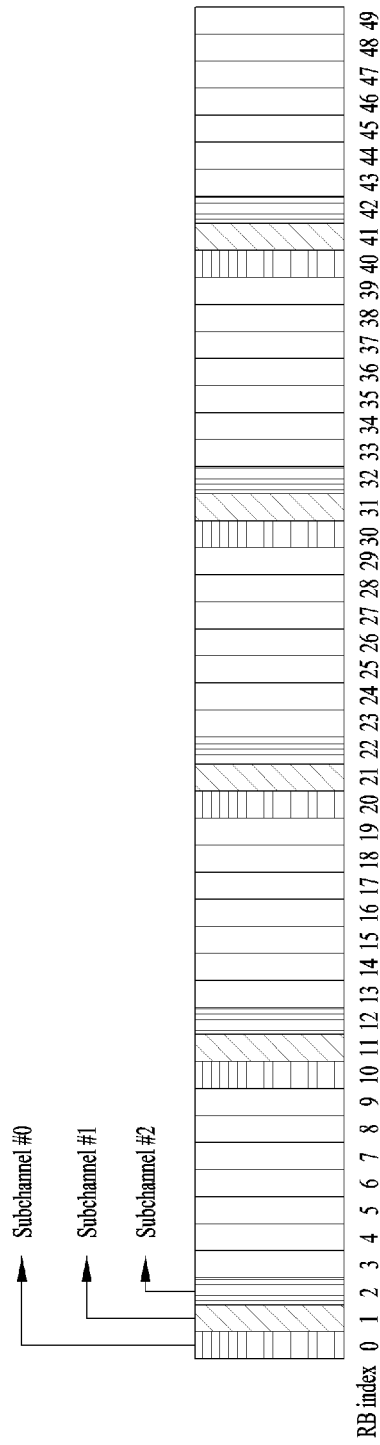
FIGS. 11 to 12 are diagrams illustrating subchannels according to one embodiment of the present invention.

Indexes of the subchannels can be sequentially assigned to subchannels including clusters/RB groups adjacent to each other. Specifically, referring to FIG. 11, an RB group (a group of clusters consisting of 1 RB) including RBs corresponding to RB indexes 0, 10, 20, 30, and 40 configures a subchannel #0. Similarly, an RB group (a group of clusters consisting of 1 RB) including RBs corresponding to RB indexes 1, 11, 21, 31, and 41 configures a subchannel #1 and an RB group (a group of clusters consisting of 1 RB) including RBs corresponding to RB indexes 2, 12, 22, 32, and 42 configures a subchannel #2. As shown in FIG. 11, subchannel indexes #0, #1, and #2 are sequentially assigned to subchannels including clusters/RB groups adjacent to each other. In particular, when subchannel indexes are assigned and a plurality of subchannels are selected by a UE, if the UE is configured to use subchannels of sequential indexes, it is able to reduce in-band emission (IBE). In particular, if subchannel indexes are sequentially assigned between RB groups adjacent to each other, the UE can select RB groups adjacent to each other when selecting a plurality of subchannels. By doing so, it is able to reduce IBE. To this end, as mentioned in the foregoing description, one subchannel can be configured by gathering RBs separated from each other with a space of the N number of RBs and each subchannel can be sequentially indexed according to RBs adjacent to each other. When a Tx/Rx UE selects a subchannel, the Tx/Rx UE may use a method of signaling a start point and an end point of a subchannel index.

Figure 12:
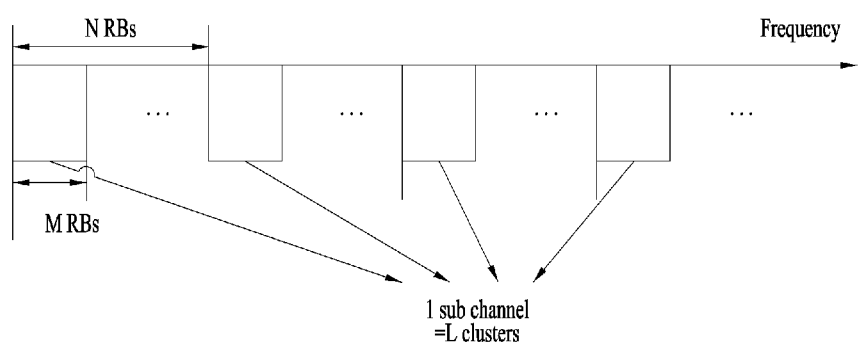

FIG. 12 illustrates a subchannel in the aspect of a cluster. Referring to FIG. 11, RBs constructing a subchannel are separated from each other in a unit of 1 RB. On the contrary, referring to FIG. 12, a subchannel is configured by a set/group of clusters including two or more RBs. More specifically, one cluster is formed by the M number of RBs, each cluster is separated from a frequency domain as much as the N number of RBs, and one subchannel is formed by the L number of clusters (L corresponds to a value resulted from dividing a bandwidth by N). In this case, all or a part of M, N, and L can be determined in advance or can be signaled by a network. And, all or a part of M, N, and L can be differently configured according to a sidelink channel, a resource pool, a bandwidth, or an operating band.

A network can signal an RA scheme (localized RA or distributed RA) to be used for a specific resource pool or a specific carrier to a UE via physical layer signaling or higher layer signaling. In order for a transmission UE to inform a reception UE of an RA (resource allocation) type of the transmission UE, the transmission UE can transmit information indicating the RA type by including the information in SA. Or, it may be able to determine a rule that reception UEs assume reception according to an RA type signaled by a network or perform reception according to a predetermined RA type.

Transmission of Multiple SAs in Single Subframe

Figure 13:
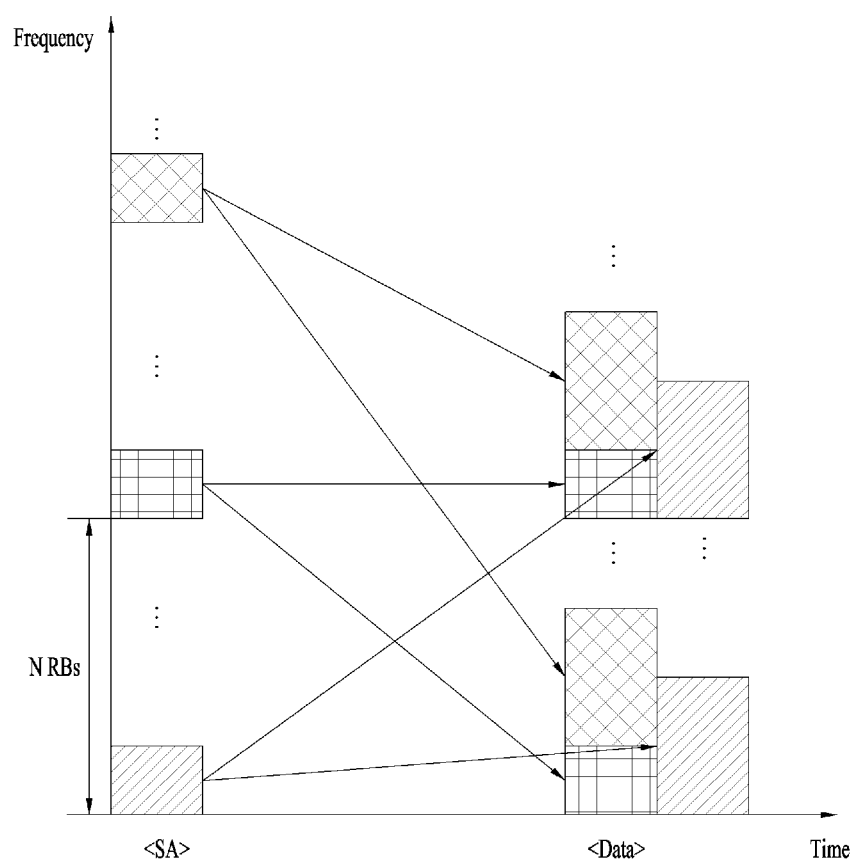
FIGS. 13 to 14 are diagrams for explaining a method of transmitting SA and data according to one embodiment of the present invention.

Meanwhile, in order to make SA schedule independent data, it may be able to allow multiple SAs to be transmitted in a single subframe. SAs or SA groups different from each other in frequency domain can be used for allocating a different data. If data is allocated to a different frequency domain, it may indicate that a plurality of RBs different from each other are allocated in a single component carrier and a data is individually scheduled on a plurality of component carriers different from each other. To this end, a CIF (carrier indication field), which indicates data transmitted on a different component carrier, can be transmitted in a manner of being included in SA. (Yet, the CIF field can be regarded as a sort of a resource allocation (RA) field.) In particular, as shown in FIG. 13, each of SAs can be transmitted in a single subframe to schedule data different from each other. In order to indicate a transmission position of each of the data, each of the SAs performs additional time/frequency resource indication and an RB number, a packet ID, and the like can be transmitted in a manner of being included in SA. In this case, when single SA schedules a plurality of distributed data, although it is able to transmit multiple SAs, it may also transmit SA including a plurality of RA fields. This may cause the increase of blind decoding complexity of SA. However, it may have a merit in that it is able to maintain single carrier property by transmitting multiple SAs at a time.

In this case, the data different from each other may correspond to a different retransmission of the data. In particular, multiple SAs (or single SA) transmitted in a single subframe can indicate retransmissions different from each other for a data.

Or, the data different from each other may correspond to a different RV of the same packet. For example, when 4 SAs are transmitted in a specific subframe, each of the SAs can indicate RA for a different RV of the same data. An RV can be signaled in a manner of being explicitly included in SA or can be transmitted in a manner of being piggybacked on a partial region of data. If SA is transmitted to a specific region, the SA can indicate a specific RV of data. In particular, when SAs are transmitted in a single subframe, although the SAs are transmitted by the same UE, it may be able to determine a rule that the SAs are not combined.

Subchannel Structure and Transmission of Multiple SAs

Figure 14:
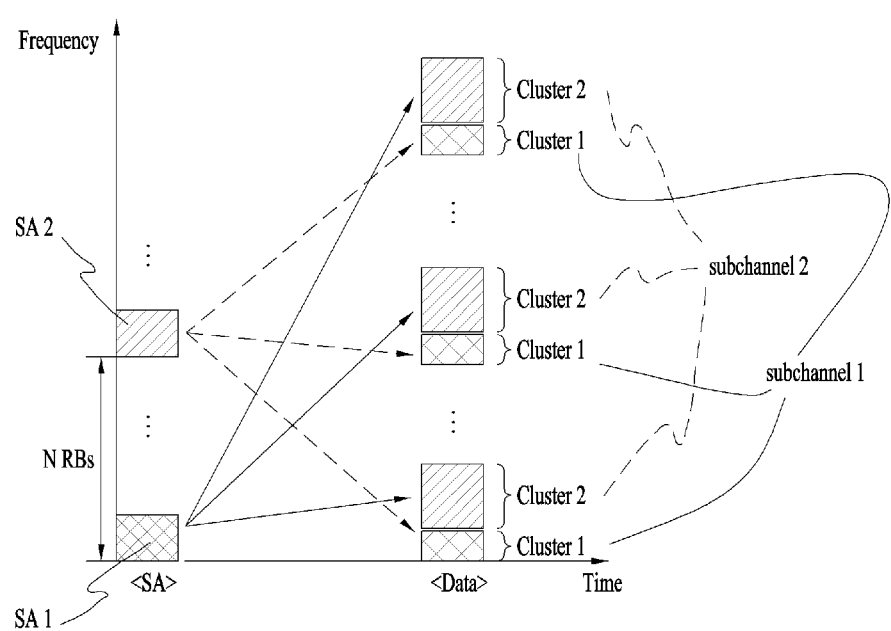

As mentioned in the foregoing description, when multiple SAs are transmitted, data indicated by each of the SAs can be transmitted via a subchannel structure. Specifically, a UE receives SA 1 and SA 2 in the first subframe and can receive data 1 and data 2 via subchannels respectively indicated by the SA 1 and the SA 2. In this case, the data 1 and the data 2 are received via a subchannel 1 and a subchannel 2, respectively. Each of the subchannel 1 and the subchannel 2 can be configured by a plurality of clusters separated from each other in frequency domain. When a plurality of the clusters are separated from each other in each of the subchannel 1 and the subchannel 2, a space between clusters is the same in the subchannel 1 and the subchannel 2. Each of a plurality of the clusters can include one or more consecutive resource blocks. And, an index of a subchannel can be sequentially assigned to subchannels including clusters adjacent to each other. FIG. 14 illustrates an example that multiple SAs are transmitted and data indicated by each of the multiple SAs is transmitted via a subchannel structure. For details, it may refer to the aforementioned contents.

The data 2 may correspond to retransmission of the data 1. Or, the data 2 may correspond to an RV (redundancy version) of the data 1. When a UE performs decoding, combining between the SA 1 and the SA 2 is not permitted and combining between the data 1 and the data 2 can be permitted.

Method Through Interleaver

When it is difficult to fully use transmit power due to the aforementioned PSD regulation, the problem can be solved by separating RBs from each other more than 6 RBs via an interleaver. In particular, a size of a row of the interleaver is determined by a size capable of satisfying the PSD regulation. Specifically, in order to separate VRB with a space of 6 RBs (In this case, 6 is just an example only. The number could be an integer greater than 6), it may be able to configure an interleaver of which the number of column corresponds to 6. A transmission entity sequentially writes VRB indexes on a matrix of X*6 (in this case, X corresponds to ceil(N/6)) in row direction and reads the VRB indexes in column direction. In this case, if the total number of available RBs (a system BW or the number of RBs of a D2D resource pool) is less than the multiple of the number of rows and the number of column of an interleaver, it is necessary to insert nulls. Specifically, the nulls can be arranged in a manner of being distributed from the last row or the last column.

A row size of an interleaver can be determined in advance according to a system band width or can be determined by a network. If a UE uses DVRB to satisfy PSD regulation, the row size of the interleaver can be configured by the decision of the UE. In this case, in order for the UE to inform a reception UE of an interleaver used by the UE, information on the interleaver (interleaver unit size) can be transmitted in a manner of being included in a control channel (e.g., PSCCH) transmitted by the UE.

Figure 16:
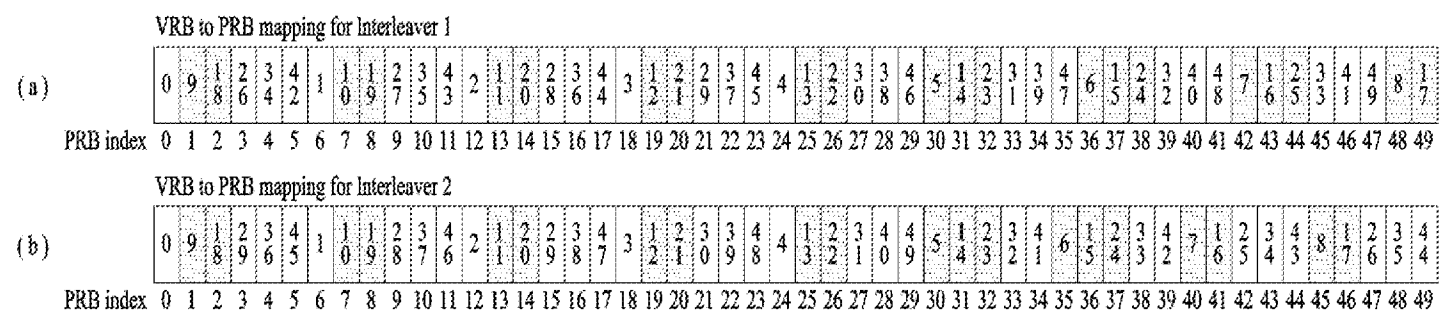

In the abovementioned VRB to PRB mapping scheme, if a transmission UE indicates a resource position of data by indicating a start point and an end point of an RB, the UE is able to naturally select an adjacent RB when wide band transmission is performed. For example, assume a case that a UE transmits 20 RBs. When the UE selects VRBs ranging from a VRB #5 to a VRB #24, if PRB mapping is performed on each interleaver shown in FIG. 15, it may be able to have a result shown in FIG. 16. Referring to FIG. 16, in order to more uniformly distribute RBs, it is preferable to evenly distribute nulls rather than concentrate on a specific column.

In the present scheme, when a UE distributes RBs in a unit of N RB and then selects an RB, it may be able to reduce occurrence of IBE by sequentially selecting RBs near a previously selected RB. In order to satisfy PSD regulation, a UE can distribute RBs with the same space. In this case, IBE occurs in the vicinity of each RB and reception capability of a different UE can be deteriorated. Hence, it is preferable to distribute RBs as much as a level capable of satisfying the PSD regulation and configure clusters to be concatenated as much as possible. This is a method of implementing an interleaver according to an embodiment of the present invention.

Figures 17, 18:
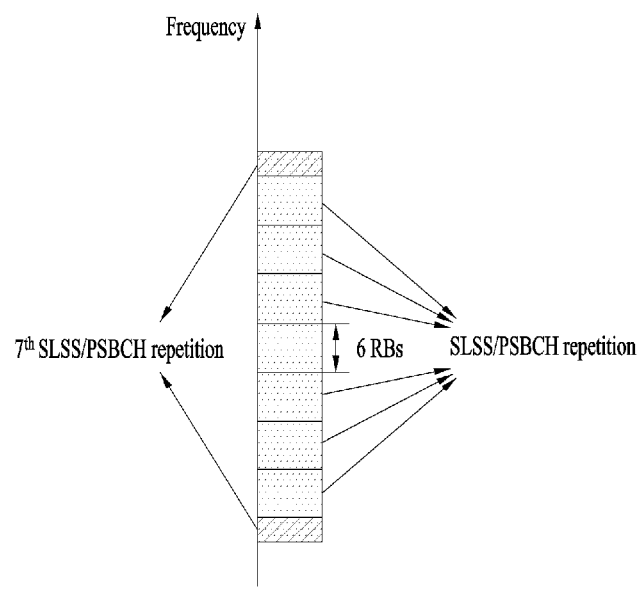

As mentioned in the foregoing description, a unit of distributing RBs can be determined in advance or is configured to vary according to a specific condition. Or, the unit is configurable. For example, in 50 RBs (100 MHz), RBs can be distributed in a unit of 10 RBs. In this case, a column size of an interleaver corresponds to 10 and the number of rows corresponds to 5. Similarly, if a transmission entity writes VRB indexes in vertical direction and sequentially reads the indexes in horizontal direction, consecutive VRBs are separated in a unit of 10 RBs. FIG. 17 illustrates an embodiment of the interleaver.

An offset (gap) per bandwidth shown in Table 1 in the following is defined for the DVRB (distributed virtual RB). In order to perform DVRB to PRB mapping using the offset (gap) per bandwidth, it may use contents written on 3GPP TS 36.211 document 6.2.3.2 Virtual resource blocks of distributed type.

TABLE 1

| System BW ($N_{RB}^{DL}$) | Gap ($N_{gap}$) | |
| --- | --- | --- |
| | 1st Gap ($N_{gap,1}$) | 2nd Gap ($N_{gap,2}$) |
| 6-10 | $\lceil N_{RB}^{DL}/2 \rceil$ | N/A |
| 11 | 4 | N/A |
| 12-19 | 8 | N/A |
| 20-26 | 12 | N/A |
| 27-44 | 18 | N/A |
| 45-49 | 27 | N/A |
| 50-63 | 27 | 9 |
| 64-79 | 32 | 16 |
| 80-110 | 48 | 16 |

And, it may apply an offset between slots. Information on whether or not an offset is applied between slots can be determined in advance or can be signaled by a network via physical layer signaling or higher layer signaling. In order to inform a reception UE of information on whether or not an offset is applied between slots of data, the information and/or an offset size can be transmitted in a manner of being included in a control signal transmitted by a UE. For example, an offset value between slots is transmitted in a manner of being included in SA. If the offset value corresponds to 0, an offset is not applied between slots. A method of applying an offset between slots can be extensively applied not only to a method of distributing RBs but also to methods described in the following.

When SA and Data are FDMed, Method of Determining Resource Position of SA

According to a localized resource allocation method, SA and data use a different DFT precoding. If data are discontinuously transmitted in frequency domain, CM can be increased. In order to prevent the CM from being increased, it may consider a method of continuously transmitting SA at an end point of the data. However, according to a distributed VRB allocation method, since data are already discontinuously transmitted, it may be ambiguous to interlock a transmission position of SA with a data position. In the following, when SA and data are transmitted in a manner of being FDMed, a method of determining an SA resource is explained.

First of all, in order to maintain unity with the localized resource allocation method, it may be able to transmit SA at a VRB index concatenated with data. In VRB domain, a resource of SA is transmitted at a VRB index concatenated with a VRB index of data. For example, it may use a VRB index concatenated with the first index of data or a VRB index concatenated with the last VRB index of the data to transmit SA in VRB domain. According to the present method, although a resource is allocated by a localized scheme, since SA and data are continuously transmitted, it may have a merit in that it is able to reduce the number of RA (resource allocation) bits of the SA.

Second, SA can be transmitted in a specific PRB adjacent to a data PRB in PRB domain (e.g., a method of selecting a PRB concatenated with the smallest PRB index or the biggest PRB index among PRBs to which data is mapped). Or, it may also consider a method of arranging SA between PRBs to which data is allocated.

Recently, discussion on 33 dBm TX power or PSD restriction is in progress. A format in use, a resource allocation scheme (whether to use multi-cluster), and whether or not SA and data are transmitted in the same subframe can be determined according to TX power, a power class, or a CC (component carrier). If SA and data are transmitted in the same subframe, CM increases. Hence, it is necessary to perform power backoff. Although a UE capable of using more Tx power performs backoff, the UE can perform transmission without decreasing coverage. In particular, it may be able to determine a rule that a UE having a Tx power level equal to or greater than a prescribed level or a UE having a high power class performs the abovementioned operation only. Or, information on whether or not SA and data are transmitted in the same subframe can be signaled or preconfigured by a network according to a resource pool or a CC.

When Multiple Resource Pools are FDMed, Interleaving Method

Meanwhile, when multiple resource pools are interleaved, a method of indicating RBs of a resource pool and a method of allocating RBs are described in the following.

First of all, indication of a resource pool can be performed in VRB domain. According to the present method, since a resource pool is indicated in VRB domain, one resource pool is interleaved with another resource pool in frequency domain. In particular, although a resource pool is configured to be narrow in frequency domain, since actual transmission of data is distributed in frequency domain, it is able to more easily satisfy PSD regulation.

Second, indication of a resource pool can be performed in PRB domain. According to the present method, since resource pools are separated in PRB domain, an interleaving operation is performed within a pool only and a VRB size of each pool is configured by a size as much as a pool. In this case, an interleaving size can be additionally signaled according to a pool or an interleaving size (an RB size for separating VRB) can be determined in advance irrespective of a size of a pool. According to the present method, it may have a merit in that it is able to reduce IBE between resource pools different from each other. However, since it is difficult to sufficiently distribute RBs, it may have a demerit in that it is difficult to fully use transmit power to satisfy PSD regulation.

Third, a resource pool is configured in a manner of being interleaved and localized resource allocation or distributed resource allocation can be applied within the pool. According to the present method, when a resource pool is configured, the resource pool is configured in a manner of being distributed in a form of a plurality of clusters, RB numbers are re-indexed within the resource pool, and DVRB or LVRB is applied. According to a current LTE release 12/13 sidelink, each resource pool is configured in a form of two clusters. The method above can be extensively applied. In particular, if a resource pool is configured in a form of the N number of clusters and DVRB is applied, it is able to make interleaving to be applied in each resource pool. According to the method above, since it is able to reduce a case that FDM is performed in a manner of being excessively distributed between resource pools, it is able to reduce an impact of IBE between pools and transmit RBs by distributing the RBs. In particular, PSD regulation can be satisfied.

Meanwhile, if a VRB is interleaved, a DMRS is mapped in the lastly interleaved PRB domain. In this case, it may consider a method of mapping an additional DMRS of a short length (an RB size occupied by a cluster) according to a cluster or a method of generating a (long) DMRS of all RB lengths used by a specific UE and sequentially mapping the DMRS according to a cluster (in an ascending order of a PRB index). In the latter case, DMRS generation can maintain commonality with localized resource allocation and reduce the increase of PAPR/CM of a DMRS. In the former case, since a DMRS is generated according to a cluster, channel estimation of each cluster is enhanced. On the contrary, since ZC of a short length is multiplexed in frequency domain, there is a possibility that PAPR/CM is to be increased.

Meanwhile, in case of using the interleaved RB allocation, DFT precoding can be separately performed according to a cluster (localized, consecutive PRB group). Or, it may apply DFT precoding of a size identical to a size of a PRB allocated to a specific UE to transmit data. In the latter case, it may have a merit in that PAPR/CM is decreased and implementation complexity of a UE is also reduced. In the former case, it may have a merit in that it is able to easily perform multiplexing with a different UE according to a cluster. However, since PAPR/CM increases and it is necessary to perform DFT precoding several times, implementation complexity of a UE may increase.

Repetitive Transmission of SA in Frequency Domain

In case of performing 1 RB narrowband transmission such as SA (scheduling assignment, PSCCH) or in case of transmitting data (PSSCH) less than 6 RBs, it is necessary to perform transmission by reducing power to satisfy PSD regulation (PSD per 1 MHz). In this case, although RB interleaving is performed, since a single UE uses a single RB only, it is unable to fully use transmit power. In order to solve the problem above, the present invention proposes a method of repeating an RB in frequency domain.

For example, it may consider a method of transmitting 1 RB SA by repeating the 1 RB SA as many as N RBs. In this case, similar to the aforementioned RB interleaving method, each RB is transmitted in a manner of being separated with a space of a prescribed RB in frequency domain. In this case, in order to perform multiplexing between UEs different from each other, it may be able to apply an OCC in an RB unit. For example, in case of performing 2RB repetition, a UE A transmits a first RB and a second RB by multiplying the first RB and the second RB by [1 1] code and a UE B transmits a first RB and a second RB by multiplying the first RB and the second RB by [1 −1] code.

Although N RB repetition can be simply transmitted in succession, repetition can be applied in a different RB in every UE within SA pool. By doing so, it may be able to obtain an effect of reducing collision between UEs. In particular, it is not necessary to continuously select VRB. A UE may autonomously select a SA resource based on sensing or may randomly select an SA resource. An RB selected by a UE can be determined by a function for determining UE implementation or a function interlocked with an ID of SA. For example, a UE of which an SA ID corresponds to 1 uses VRB #1 and VRB #3 and a UE of which an SA ID corresponds to 3 can use VRB #1 and VRB #4.

When SA is repeated in frequency domain, in order to make a reception UE obtain a combining gain, a repetition interval can be transmitted in a manner of being included in the SA in a UCI piggyback form. Having received the SA, a UE decodes piggybacked information on which additional channel coding is performed to identify a position of a different repeated SA and can perform decoding by combining the position of the different repeated SA. Or, the UE can indicate a position of a separated SA or SA repeated with a specific interval by differently configuring a DMRS CS or an OCC of SA. According to the present method, when SAs are transmitted in a single subframe, a reception UE can expand the coverage of SA by combining the SAs with each other.

When 1 RB SA is repeated in frequency domain, it may be able to transmit RVs by configuring all of the RVs by 0. By doing so, although a UE fails to decode SA of a specific frequency resource, the UE can successfully perform decoding by receiving an RV0 which has a lot of systematic bits. Or, when SA is repeated in frequency domain, an RV can be transmitted in a manner of being differently configured. In this case, in order to make a reception UE recognize the RV, it may be able to determine a rule that a DMRS CS is differently configured according to an RV, an RV (of SA) is transmitted in a manner of being included in SA in a UCI piggyback form, or a specific RV is to be used for a specific frequency resource. As an example for a method of transmitting an RV with a predetermined scheme according to an RB region, RBs 0 to 9 are transmitted by an RV 0 and RBs 10 to 19 can be transmitted by an RV 2.

When data are repeated in frequency domain in a manner of being separated, the degree of separation can be determined in advance or may follow the degree of separation of the aforementioned DVRB. Or, the degree of separation (interleaving space according to an RB or an RB group and/or the number of RBs (a cluster size, in this case, a cluster corresponds to the number of RBs continuously allocated in frequency domain)) according to an RB group can explicitly signaled by SA. In case of data, a repetition count and an RV can be transmitted in a manner of being included in SA. And, a field indicating an RV 0 (chase combining) or a variable RV (incremental redundancy) can be transmitted in a manner of being included in SA. In particular, when data is repeated in frequency domain, it may be able to transmit the same RV or a different RV depending on an indication of SA.

The methods above can also be applied to a case that SA is not 1 RB.

Or, SA may have multiple RB formats. For example, it may be able to define SA formats of the N number of RBs on a CC of which PSD regulation is tight. Similar to the aforementioned DVRB scheme, the SA can be transmitted in a manner of being separated in frequency domain.

In order to make a transmission UE and a reception UE use the same SA format, a network can signal information on the SA format to the UEs according to a resource pool or a CC via physical layer signaling or higher layer signaling. In this case, not only an RB size but also contents and/or a physical layer format (e.g., the number of DMRSs is changed or a format transmitting RS is changed in every symbol) included in each SA format can be changed. Or, a network can signal whether or not frequency domain SA is repeated (separated with a prescribed space) according to a resource pool or a CC. If a UE is located at the outside of the coverage of the network, the abovementioned information can be preconfigured.

Meanwhile, in order to satisfy not only PSD regulation but also high mobility, SA and/or a data format can be changed. For example, in order to more precisely estimate/compensate for a frequency offset in high mobility, it may be able to introduce a format having a type of transmitting an RS in every symbol or a format of using more DMRSs. Or, SA, an RB size of data, and a subchannel size can be changed. (In order to secure a lower code rate,) a network can signal SA and/or a data format to be used on a specific CC or a specific resource pool to a UE via physical layer signaling or higher layer signaling. Or, a specific format to be used on a specific CC or a specific resource pool can be determined in advance. The change of an RB allocation scheme for satisfying PSD regulation and the format change for high mobility can be indicated to a UE via additional signaling.

In a specific region where velocity of a UE is very fast (e.g., highway, etc.), a network can indicate the UE to use a physical layer format capable of more precisely estimating/compensating for a frequency offset. Or, the physical layer format can be determined in advance. And, in a resource pool of the boundary of a point at which the highway ends, the network can indicate the UE to use a format relatively less capable of precisely estimating/compensating for a frequency offset. Or, the format can be determined in advance. The operation above can be additionally applied to a method of distinguishing a resource pool according to a UE position. For example, in a mechanism that makes a specific resource pool to be used according to a position of a UE, while a specific resource pool is used in a specific region according to a position of a UE, a physical layer format used in the specific resource pool can be designated according to the aforementioned method. The UE can signal velocity information to the network via physical layer signaling or higher layer signaling to help a format change indication of the network.

The aforementioned methods can also be applied to a case that data is transmitted. For example, when a narrow band data is transmitted or repetition is performed in frequency domain to satisfy PSD regulation, data can be repeatedly transmitted in frequency domain in a manner of being separated with a prescribed space.

Meanwhile, the repetitive transmission can be extended to repetition of SLSS or PSBCH. According to current LTE release 12/13 D2D, SLSS/PSBCH is transmitted on the center 6 RBs. In this case, due to PSD regulation, it is unable to fully use transmit power. In this case, the SLSS/PSBCH of 6 RBs can be repeatedly transmitted in frequency domain. A repetition count can be differently configured according to a sidelink BW or a system bandwidth. For example, as shown in FIG. 18, in a 50-RB system, repetition mapping can be performed 6 times or 7 times except the center 6 RBs. In case of the $7^{th}$ repetition, in order to maintain symmetry on the basis of the center, 3 RBs can be respectively mapped to RB positions symmetrical to each other on the basis of a DC carrier.

Sub RB (a Group of Subcarriers) Distribution

Meanwhile, if a specific packet is simply repeated in frequency domain, multiplexing capacity of overall system can be degraded. Hence, in order to secure multiplexing capacity while PSD regulation is satisfied as much as possible, it may use a method of performing FDM in a sub-RB (group of subcarriers) unit. More specifically, when a narrow band transmission is performed or a narrow band packet (transmission of RBs equal to or less than a prescribed number) is transmitted together with SA, it may consider a method of performing transmission in a unit of a cluster corresponding to a set of subcarriers of a certain number (it is necessary to distinguish the cluster from the aforementioned cluster corresponding to a set of RBs). In this case, in order to distribute RE positions according to a UE within an RB, it may be able to differently configure an RE position within the RB. For example, a UE A uses subcarriers #0 to #5 and a UE B uses subcarriers #6 to #11 in an RB 1 and an RB 2. Or, the UE A may use the subcarriers #0 to #5 in the RB 1 and use the subcarriers #6 to #11 in the RB 2. The UE B can use the remaining subcarriers. In the former case, subcarriers are transmitted at the same position. In the latter case, when RBs are distributed in a manner of being partitioned, a subcarrier position within an original RB is used as it is.

Figure 19:
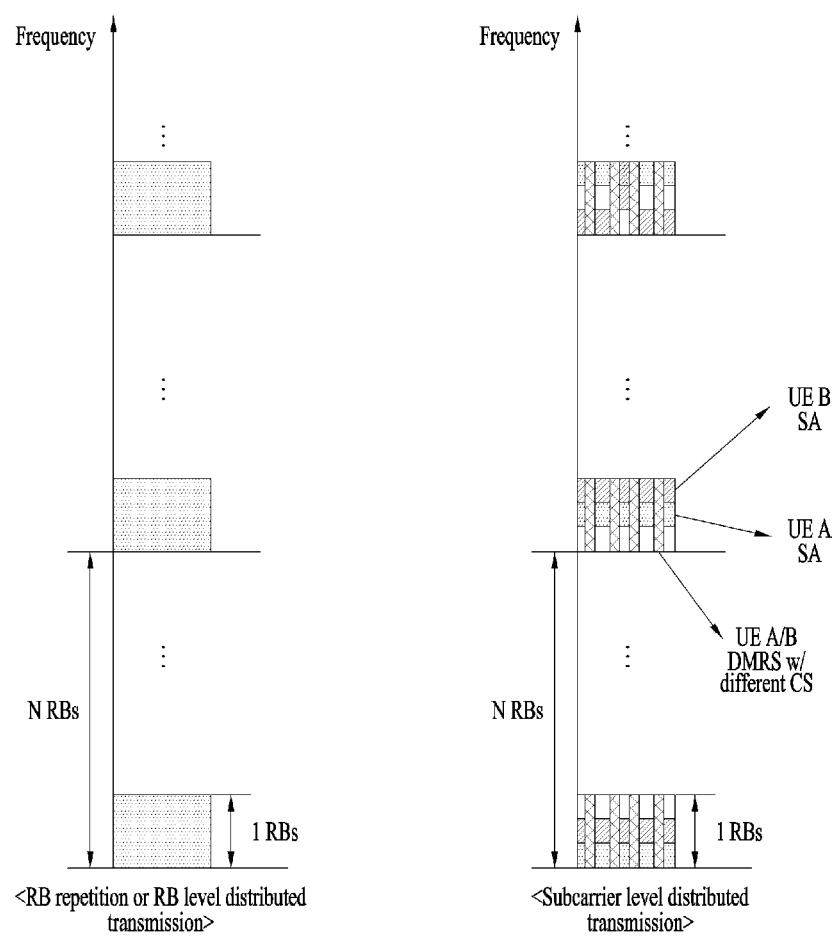
FIG. 19 is a diagram for explaining sub-RB distributed transmission according to one embodiment of the present invention.

FIG. 19 illustrates an example for a method of performing transmission by distributing 3 RBs in a unit of 4 subcarriers in the latter case. In this case, a DMRS can be transmitted in an RE in which data is transmitted only. Or, it may be able to transmit the whole of DMRS according to an RB. When the whole of DMRS is transmitted according to an RB, it may be able to differently configure CS according to an RE position to transmit the DMRS. For example, when a UE uses a small subcarrier index within a specific RB, the UE transmits a DMRS using CS 0. When a UE uses a big subcarrier index within a specific RB, the UE can transmit a DMRS using CS 6. If a DMRS is transmitted in an RE in which data is transmitted only within an RB, since a DMRS length becomes too short, channel estimation performance can be deteriorated. In particular, in order to increase multiplexing capacity, a data RE is transmitted using a partial RE only. On the other hand, since it is able to transmit a DMRS of a full size of 1 RB, CS is differently configured to perform RS multiplexing with a different UE. In addition, if the whole of RS is transmitted within an RB, a data RE can hop within the RB according to a symbol. For example, when a UE uses REs #0 to #3 within an RB, the UE uses REs #0 to #3 in the first symbol, uses REs #4 to #7 in the second symbol, uses REs #8 to #11 in the third symbol, and uses REs #0 to #3 again in a next symbol. According to the present scheme, an RE position is changed within a symbol to enhance RS channel estimation performance and an order of being FDMed with a different UE is changed to obtain an effect of randomizing an impact of IBE.

If a distribution transmission in a sub RB unit is permitted, it is able to perform energy sensing in a unit of a resource used by an individual UE in a resource pool or an RB set in which the distribution transmission is permitted. For example, in FIG. 11, energy of an RE used by the UE A and energy of an RE used by the UE B are separately sensed/measured and a resource can be selected based on the sensed/measured energies.

Meanwhile, if the proposed methods are applied in a mode 1 (eNB based sidelink signal transmission), an eNB can inform a UE of information on a format/RB distribution/indexing scheme to be used for DCI, information on a subcarrier used in an RB, and the like. The information can be signaled to the UE in advance via higher layer signaling.

Although the aforementioned contents mainly describe a case that a UE transmits a signal, the contents can also be applied to a case that such nodes as an eNB, an RSU (road side unit), an AP (access point), and a relay transmit a signal. And, the contents can be applied not only to V2X but also to a sidelink transmission of a different type.

Examples for the aforementioned proposed methods can also be included as one of implementation methods of the present invention. Hence, it is apparent that the examples are regarded as a sort of proposed schemes. The aforementioned proposed schemes can be independently implemented or can be implemented in a combined (aggregated) form of a part of the proposed schemes. It may be able to configure an eNB to inform a UE of information on whether to apply the proposed methods (information on rules of the proposed methods) via a predefined signal (e.g., physical layer signal or upper layer signal).

DEVICE CONFIGURATIONS ACCORDING TO EMBODIMENT OF THE PRESENT INVENTION

Figure 20:
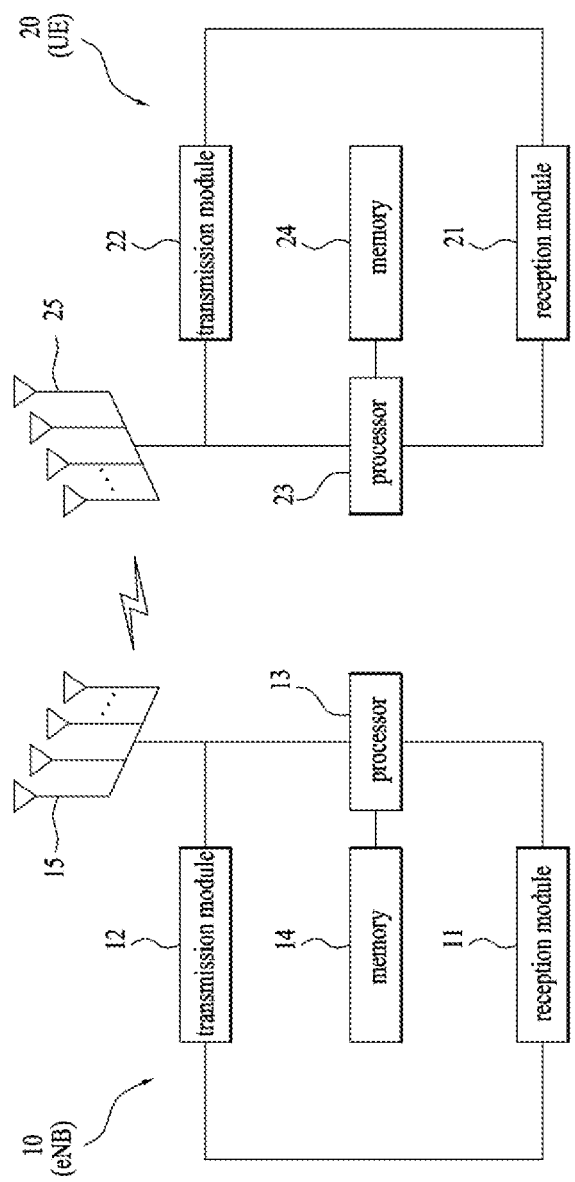
FIG. 20 is a diagram for configurations of a transmitter and a receiver.

FIG. 20 is a diagram illustrating configuration of a transmit point apparatus and a UE according to one embodiment of the present invention.

Referring to FIG. 20, a transmit point apparatus 10 may include a receive module 11, a transmit module 12, a processor 13, a memory 14, and a plurality of antennas 15. The antennas 15 represent the transmit point apparatus that supports MIMO transmission and reception. The receive module 11 may receive various signals, data and information from a UE on an uplink. The transmit module 12 may transmit various signals, data and information to a UE on a downlink. The processor 13 may control overall operation of the transmit point apparatus 10.

The processor 13 of the transmit point apparatus 10 according to one embodiment of the present invention may perform processes necessary for the embodiments described above. The processor receives SA 1 and SA 2 in the first subframe via the transmit module and receives data 1 and data 2 via subchannels respectively indicated by the SA 1 and the SA 2. The data 1 and the data 2 are respectively received via a subchannel 1 and a subchannel 2 and each of the subchannel 1 and the subchannel 2 can be configured by a plurality of clusters separated from each other in frequency domain.

Additionally, the processor 13 of the transmit point apparatus 10 may function to operationally process information received by the transmit point apparatus 10 or information to be transmitted from the transmit point apparatus 10, and the memory 14, which may be replaced with an element such as a buffer (not shown), may store the processed information for a predetermined time.

Referring to FIG. 20, a UE 20 may include a receive module 21, a transmit module 22, a processor 23, a memory 24, and a plurality of antennas 25. The antennas 25 represent the UE that supports MIMO transmission and reception. The receive module 21 may receive various signals, data and information from an eNB on a downlink. The transmit module 22 may transmit various signals, data and information to an eNB on an uplink. The processor 23 may control overall operation of the UE 20.

The processor 23 of the UE 20 according to one embodiment of the present invention may perform processes necessary for the embodiments described above.

Additionally, the processor 23 of the UE 20 may function to operationally process information received by the UE 20 or information to be transmitted from the UE 20, and the memory 24, which may be replaced with an element such as a buffer (not shown), may store the processed information for a predetermined time.

The configurations of the transmit point apparatus and the UE as described above may be implemented such that the above-described embodiments can be independently applied or two or more thereof can be simultaneously applied, and description of redundant parts is omitted for clarity.

Description of the transmit point apparatus 10 in FIG. 20 may be equally applied to a relay as a downlink transmitter or an uplink receiver, and description of the UE 20 may be equally applied to a relay as a downlink receiver or an uplink transmitter.

The embodiments of the present invention may be implemented through various means, for example, hardware, firmware, software, or a combination thereof.

When implemented as hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented as firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to accord with the widest scope corresponding to the principles and novel features disclosed herein.

The present invention may be carried out in other specific ways than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to accord with the widest scope consistent with the principles and novel features disclosed herein. In addition, claims that are not explicitly cited in each other in the appended claims may be presented in combination as an embodiment of the present invention or included as a new claim by subsequent amendment after the application is filed.

INDUSTRIAL APPLICABILITY

The embodiments of the present invention can be applied to various mobile communication systems.

What is claimed is:

1. A method of receiving SA (Scheduling Assignment) and data by a user equipment UE in a wireless communication system, comprising the steps of:
   receiving SA 1 and SA 2 in a first subframe; and
   receiving data 1 and data 2 via subchannels indicated by the SA 1 and the SA 2, respectively,
   wherein the data 1 and the data 2 are received via a subchannel 1 and a subchannel 2, respectively, and
   wherein each of the subchannel 1 and the subchannel 2 is configured by a plurality of clusters separated from each other in a frequency domain.

2. The method of claim 1, wherein when a plurality of the clusters are separated in each of the subchannel 1 and the subchannel 2, a space of the separation is the same in the subchannel 1 and the subchannel 2.

3. The method of claim 2, wherein each of a plurality of the clusters contains one or more consecutive resource blocks.

4. The method of claim 1, wherein an index of a subchannel is sequentially assigned to subchannels containing clusters adjacent to each other.

5. The method of claim 1, wherein the data 2 corresponds to retransmission of the data 1.

6. The method of claim 1, wherein the data 2 corresponds to an RV (Redundancy Version) of the data 1.

7. The method of claim 1, wherein when the UE performs decoding, combining between the SA 1 and the SA 2 is not permitted and combining between the data 1 and the data 2 is permitted.

8. A method of transmitting SA (Scheduling Assignment) and data by a user equipment UE in a wireless communication system, comprising the steps of:
   transmitting SA 1 and SA 2 in a first subframe; and
   transmitting data 1 and data 2 via subchannels indicated by the SA 1 and the SA 2, respectively,
   wherein the data 1 and the data 2 are transmitted via a subchannel 1 and a subchannel 2, respectively, and
   wherein each of the subchannel 1 and the subchannel 2 is configured by a plurality of clusters separated from each other in a frequency domain.

9. The method of claim 8, wherein when a plurality of the clusters are separated in each of the subchannel 1 and the subchannel 2, a space of the separation is the same in the subchannel 1 and the subchannel 2.

10. The method of claim 9, wherein each of a plurality of the clusters contains one or more consecutive resource blocks.

11. The method of claim 8, wherein an index of a subchannel is sequentially assigned to subchannels containing clusters adjacent to each other.

12. The method of claim 8, wherein the data 2 corresponds to retransmission of the data 1.

13. The method of claim 8, wherein the data 2 corresponds to an RV (Redundancy Version) of the data 1.

14. The method of claim 8, wherein when the UE performs decoding on the SA and the data, combining between the SA 1 and the SA 2 is not permitted and combining between the data 1 and the data 2 is permitted.

15. A UE (User Equipment) receiving SA (Scheduling Assignment) and data in a wireless communication system, comprising:
   a transmitter and a receiver; and
   a processor, the processor configured to receive SA 1 and SA 2 in a first subframe via the transmitter, the processor configured to receive data 1 and data 2 via subchannels indicated by the SA 1 and the SA 2, respectively,
   wherein the data 1 and the data 2 are received via a subchannel 1 and a subchannel 2, respectively, and
   wherein each of the subchannel 1 and the subchannel 2 is configured by a plurality of clusters separated from each other in frequency domain.

16. A UE (User Equipment) transmitting SA (Scheduling Assignment) and data in a wireless communication system, comprising:
   a transmitter and a receiver; and
   a processor, the processor configured to transmit SA 1 and SA 2 in a first subframe via the transmitter, the processor configured to transmit data 1 and data 2 via subchannels indicated by the SA 1 and the SA 2, respectively,
   wherein the data 1 and the data 2 are received via a subchannel 1 and a subchannel 2, respectively, and
   wherein each of the subchannel 1 and the subchannel 2 is configured by a plurality of clusters separated from each other in frequency domain.

* * * * *